Sept. 2, 1958

W. J. HEACOCK 2,850,145

SELF-CLEARING FEEDER

Filed June 26, 1957

United States Patent Office 2,850,145
Patented Sept. 2, 1958

2,850,145
SELF-CLEARING FEEDER

Ward J. Heacock, Chicago, Ill., assignor to Link-Belt Company, a corporation of Illinois Application June 26, 1957, Serial No. 668,226

5 Claims. (Cl. 198—57)

This invention relates to conveyor-type feeders for delivering bulk material from an associated feed hopper.

An object of the present invention is to provide a conveyor-type feeder for bulk material which automatically clears itself of jams caused by unusually large pieces or lumps of material lodged between the conveyor and the feed hopper at the discharge opening of the hopper.

A more detailed object of this invention is to provide a belt, or apron conveyor-type, feeder for delivering bulk material from a hopper in which the conveyor mechanism is movable, in respect to the hopper, in response to a clogged or jammed discharge condition to automatically free the feeder of this condition.

Other objects and advantages of the invention will be apparent during the course of the following description.

Figure 1:
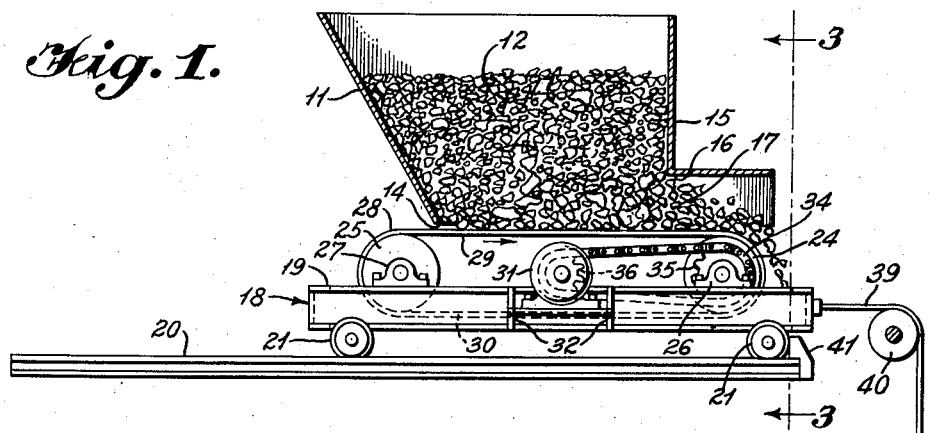
Figure 2:
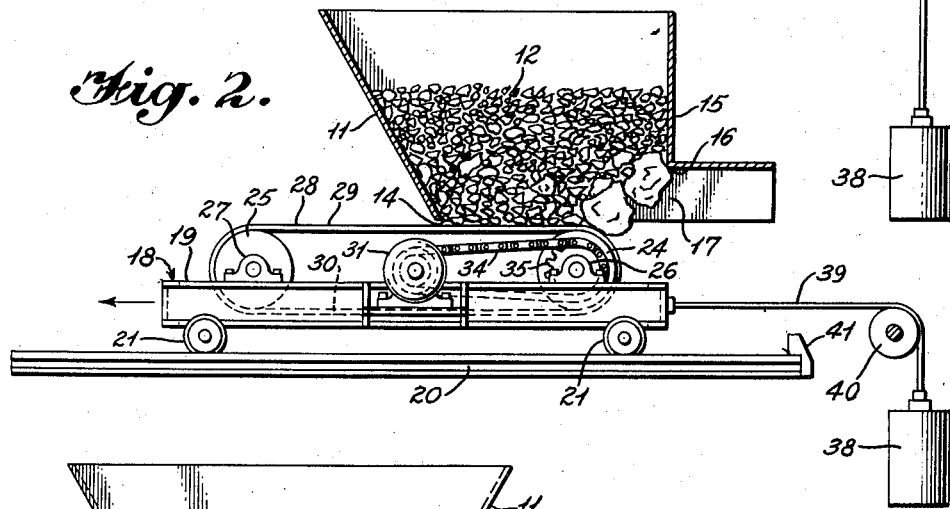
Figure 3:
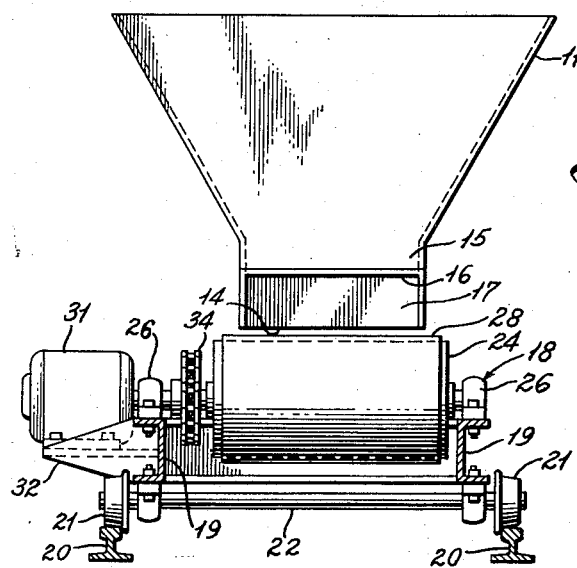

In the accompanying drawings forming a part of this specification and in which like numerals are employed to designate like parts throughout the same, Figure 1 is a side view, partly sectional and partly elevational, of a feeder embodying the present invention shown operating under normal discharge conditions, Figure 2 is a view similar to Fig. 1, except that the device is shown operating to free a clogged or jammed condition, and, Figure 3 is an end view, partly sectional and partly elevational, taken on the line 3—3 of Fig. 1.

In the drawing, wherein for the purpose of illustration is shown the preferred embodiment of this invention, and first particularly referring to Figs. 1 and 2, there is shown a feeder having a stationary feed hopper 11 containing a supply of bulk material 12. The hopper is provided with an open bottom 14 and with a forward end wall 15 having a bottom edge 16 vertically spaced from the plane of the opening 14 so as to provide an end opening 17, communicating with the opening 14, through which the material 12 is normally discharged.

Underlying the hopper 11 is a belt or apron type conveyor mechanism, indicated generally by the reference character 18, which serves to effect a controlled rate of discharge of the material 12 from the hopper 11.

In keeping with the invention, the conveyor mechanism 18 includes a mounting frame 19 supported for reciprocating movement, or travel, normal to the plane of the discharge opening 17 and parallel to the plane of the bottom opening 14. This reciprocating movability of the frame 19 may be obtained, as shown, by providing two laterally spaced tracks 20 and a pair of wheels 21, riding on each track, rotatably connected to the frame 19 by axles 22, or other suitable means.

Two terminal pulleys 24 and 25 are connected to the mounting frame 19, by means such as pillow blocks 26 and 27, for rotation about horizontal axes disposed normal to the direction of the reciprocating movement of the frame. An endless conveying member, consisting of an apron or belt 28, is trained over the terminal pulleys for movement in an upper, or load-carrying, run 29 which is closely spaced in relation to the opening 14, and a lower, or return, run 30. One of the terminal pulleys, preferably the head pulley 24 located in the forward portion of the mounting frame 19, is driven by means such as an electric motor 31. As shown, the motor may be mounted on the side of the frame 19 by a bracket 32 and drivingly connected to the head terminal pulley 24 by a drive chain 34 cooperating with a sprocket 35 fixed to the shaft of the pulley 24 and a sprocket 36 fixed to the shaft of the motor 31. The driving means is arranged to propel the load-carrying run 29 of the conveying member in a forward direction toward the head pulley 24, as indicated by the arrow in Fig. 1.

Biasing means are provided for holding the conveyor mechanism 18 in a normal operating position. In the presently illustrated device this biasing means comprises a counterweight 38 connected to the forward end of the frame 19 through a flexible tension member 39 trained over a loose pulley 40, as shown in Figs. 1 and 2. It will be apparent that the force exerted by the biasing means is readily adjustable by varying the weight of the counterweight 38.

Stop means, such as a stop member 41 connected to each of the tracks 20 and adapted to engage the wheels 21, are provided to limit the forward movement of the conveyor mechanism 18 under the influence of the counterweight 38. It will be appreciated that the counterweight acts to urge the conveyor mechanism 18 forwardly into a normal stop-engaging position and further acts to yieldingly resist movement of the feeder in a rearward direction. The stop members 41 are so positioned on the tracks so that when the wheels 21 are in engagement therewith the conveyor mechanism is in its normal operating position with the active run 29 being disposed under the bottom opening 14 and extending forwardly beyond the plane of the discharge opening 17, as indicated in Fig. 1.

The operation of the present invention may be understood by first referring to Fig. 1 which shows the conveyor mechanism 18 in its normal operating, or discharge, position. It is held in this position by the counterweight 38 which urges the wheels 21 of the frame 19 against the stop member 41. The load-carrying run 29 of the endless conveying member 28 moves, under the force of the motor 31, in a conveying motion relative to the stationary supply hopper 11 and functions to carry material 12, deposited on it adjacent the bottom opening 14, through the end opening 17 and over the head pulley 24 to a receiving means, not shown. The spacing between the run 29 and the edge 16 is such that ordinary sized pieces of material can pass through the opening 17 without difficulty.

Next referring to Fig. 2, it will be seen that the conveyor mechanism 18 maintains its normal operating position until such time as the end opening 17 becomes clogged or jammed by large pieces or lumps of material lodged in the opening or between the edge 16 and carrying run 29. The clogging pieces of material exert a secondary stalling force on the load-carrying run 29 tending to resist its normal forward motion relative to the hopper 11. It is evident that, when the stalling force exerted on the run 29, and consequently on the conveyor mechanism, exceeds the biasing force exerted on the conveyor mechanism by the counterweight 38, the load-carrying run 29 will be held stationary with respect to the hopper edge 16 and a resulting self-propelled movement of the conveyor mechanism 18 rearwardly and away from the edge 16 of the hopper 11 will be effected by the driving force of the motor 31 which will cause the pulley 24 to roll along the bottom surface of the carrying run 29. It is also clear that the conveyor mechanism 18 will move sufficiently to the rear of the hopper 11 to uncover the bottom opening 14 to the extent necessary to allow the clogging pieces to drop free of the hopper edge 16. As soon as the clogging pieces are discharged, the force exerted by them on the run 29 is removed and the conveyor mechanism is drawn back to its normal operating position by the counterweight 38.

It will also be apparent that the biasing force required for proper operation of the present device will vary in accordance with the operating conditions, and that, therefore, the weight of the counterweight 38 must be adjusted, by experiment, to suit these conditions.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. A feeder for bulk material comprising a material supply hopper having a bottom opening and a forward end wall having a bottom edge adjacent said bottom opening, an endless conveying member, means mounting said conveyor for endless conveying movement below said bottom opening and with an upper run normally extending forwardly beyond said bottom edge for carrying material from said bottom opening under said edge, means for mounting said conveying member for bodily endwise movement parallel to the path of said upper run, stop means for limiting such movement, biasing means for holding said conveying member with said upper run in said normal position, and driving means for imparting said endless conveying movement to said conveying member, said driving means being effective when pieces of material become jammed between said upper run and said bottom edge to drive said conveying member in said bodily endwise movement away from said edge to allow the jamming material to drop free of the same.

2. A feeder for bulk material comprising a material supply hopper having an open bottom and a forward end wall having a bottom edge, an endless conveying member for carrying material from said open bottom under said bottom edge, means mounting said conveying member to provide an upper run thereof mounted for conveying movement relative to and in a path normal to said bottom edge, said upper run normally being positioned to extend forwardly beyond said bottom edge in vertically spaced relationship therewith to permit the passage of ordinary sized pieces of material between said run and said edge, means for mounting said conveying member for reciprocating movement independent of and parallel to the path of said conveying movement of said upper run, stop means for limiting such reciprocating movement of said conveying member, biasing means for holding said conveying member with its upper run in said normal position, and driving means for imparting conveying movement to said conveying member to effect discharge from said hopper, said driving means being effective, when oversize pieces of material become jammed between said upper run and said bottom edge so as to hold said run stationary with respect to said hopper, to move said conveying member rearwardly along said path of reciprocating movement away from said edge and against the force of said biasing means to allow the jamming pieces of material to drop free of said bottom edge.

3. A feeder for bulk material comprising a material supply hopper having a bottom opening and a forward end wall having a bottom edge adjacent said bottom opening, an endless conveying member below said bottom opening for carrying material from said opening under said bottom edge, said conveying member being trained about two terminal pulleys to form upper and lower runs, said upper run being spaced from said bottom edge to permit the passage of ordinary sized pieces of material between said run and said edge, a frame for supporting said terminal pulleys, means for mounting said frame for reciprocating movement in a path parallel to the path of said upper run defined by said terminal pulleys, stop means for limiting the forward extent of such frame movement to a point at which said upper run is positioned to extend forwardly beyond said bottom edge, biasing means for holding said frame in said forward extent of its movement, a motor for driving one of said terminal pulleys, said motor being normally effective to impart a conveying motion to said conveying member and being effective, when pieces of material jammed between said upper run and said bottom edge impose a stalling force on the upper run greater than the force exerted by said biasing means, to move said upper run to the rear of said bottom edge to allow the jammed material to drop free of said hopper.

4. A feeder for bulk material comprising a stationary material supply hopper having a bottom opening, said hopper having a forward end wall formed with a bottom edge adjacent said bottom opening, an endless conveying member below said bottom opening for carrying material from said opening under said bottom edge trained about two terminal pulleys to form upper and lower runs, said upper run being spaced from said bottom edge to permit the passage of ordinary sized pieces of material between said run and said edge, a frame for supporting said terminal pulleys, means for mounting said frame for reciprocating travel in a path parallel to the path of said upper run defined by said terminal pulleys, stop means for limiting the forward extent of such frame travel to a point at which said upper run is positioned to extend forwardly beyond said bottom edge, a suspended counterweight for holding said frame in said forward extent of its travel, said counterweight being connected to the forward end of said frame by means of a flexible tension member trained over a stationary loose pulley, and a motor mounted on said frame for driving one of said terminal pulleys to effect forward movement of said upper run in respect to said frame, said movement of said upper run effecting discharge from said hopper while said frame is held in said forward extent of its travel and effecting rearward travel of said frame to move said upper run away from said bottom edge when pieces of material become jammed between said upper run and said edge and create a stalling force exceeding the force exerted by said counterweight.

5. In a feeder for bulk material of the type having an open bottomed material supply hopper and an endless conveyor mechanism having a load-carrying run mounted for endless conveying movement to carry material from the bottom of the hopper under a forward bottom edge of the hopper which is spaced from said load-carrying run, the improvement comprising means for mounting said conveyor mechanism for bodily movement in rearward and forward directions away from and toward said bottom edge, respectively, said bodily movement being independent of said endless conveying movement of said load-carrying run, the extent of such bodily rearward movement being sufficient to allow the forward end of said load-carrying run to be moved to a position rearward of said bottom edge, stop means for limiting the extent of such bodily forward movement to a point at which said load-carrying run extends forwardly beyond said edge, biasing means for holding said mechanism in said forward extent of its bodily movement, and drive means for imparting a conveying movement to said load-carrying run, said drive means being effective when pieces of material become jammed between said upper run and said bottom edge to drive said conveyor mechanism bodily rearward to move said load-carrying run thereof away from said edge to allow the jammed material to fall free of the same.

References Cited in the file of this patent

UNITED STATES PATENTS 1,398,047    Stevens _____ Nov. 22, 1921